Patented June 22, 1937

2,084,956

UNITED STATES PATENT OFFICE 2,084,956

METHOD OF PRESERVING PRELIMINARILY DRIED FRUIT

Karl Hessel, Berlin-Lichtenrade, Germany

No Drawing. Application May 20, 1932, Serial No. 612,635. In Germany September 12, 1929

2 Claims. (Cl. 99—168)

This invention relates to methods of preserving fruit and the like, wherein fruits, etc., are coated with a dry, pulverulent, edible substance capable of absorbing moisture such as sugar, flour, etc., in such a manner as to render the material stable in storage. The fruit is so treated in the present invention that it retains its taste in natural purity and all its parts, that is, the peel, the flesh, the vitamins, the fruit acids, etc.; only the excess unwanted moisture being removed.

It is known to preserve fruit juices by mixing them with preservative carrier substances such as sugar or starch, the mixture being pulverized and dried. However, such a process is not suitable for preserving the fruit itself. While sugar may be a suitable carrier for fruit juices, it cannot be so used with fruit material which also contains insoluble matter such as fruit pulp.

It is likewise known to mix and dry different substances by spraying them from different nozzles. In my German Patent 579,605, I disclose methods for preserving fruits, vegetables, medicinal herbs and the like, wherein disintegrated fruits, etc., are so sprayed as to retain their components. As there disclosed, the disintegrated fruits on the one hand and a dry pulverulent edible moisture-absorbing substance, such as sugar or flour, on the other hand, are sprayed from separate nozzles. In that way the said substances enwrap or coat every individual fruit particle; the sugar etc., being a coating on the fruit, not a mere "carrier" as in the theretofore proposed methods of drying fruit juices. The dried final product so obtained can be subsequently freed from any excess of sugar, etc., by treating in jigging sieves, so that the natural taste of the fruit is not concealed to an undesirable extent.

The compressed air employed for the spraying can be preheated, cooled or mixed with or replaced by other gases such as oxygen, ozone, carbon dioxid and the like, according to the season of the year and the kinds of fruits employed. An addition of ozone as is known, has a germicidal effect, so that by this procedure the durability of the final product is ensured to a much greater degree. The treatment with ozone comes into question especially when the final products are to be stored until the next harvest.

Several kinds of fruits and the said coating substances can be sprayed and mixed simultaneously. The mixing may be effected either before or after the spraying and the further mixing. The coated fruit particles may be formed into any practical shape, such as briquettes, bars, cakes, pastilles, pills, tablets and the like by pressing, casting or melting with suitable admixtures of fats, vegetable or other binding substances, such as sugar, sugar substitutes, chocolate, marzipan, and condiments.

The separate spraying of the fruit particles and of the coating substances may be carried out in like or countercurrent. The coating substances and fruit particles are preferably projected upwards in the same direction, as in this arrangement; heavy raw substances, in passing upwards, overtake the coating substances and then sink, supported in suspension on the rising coating substances, in order to become fully saturated with the coating substances and coated therewith. As the raw substance particles become gradually heavier, owing to their being continually enriched with the coating substances, they overcome the upward drive of the next following raw and coating substances and it is apparent that in this manner a perfect covering of the raw substances on all sides with the coating substances takes place.

From the above description it is evident that the processes of my German Patent 579,605 are better adapted to preserving fruit which can be pulped prior to atomizing. I have now developed another method of coating fruit with sugar, flour, etc., wherein the said atomizing procedure may be omitted. In my new method I employ preliminarily dried fruits. In the present invention the procedure is to disintegrate preliminarily dried fruit into fragments and then apply to the fragments dry pulverulent sugar or flour as hereinafter described.

It is known that dry fruits of the ordinary type are not so lasting that they may be stored for a relatively long period, as during the storing, especially if the dried fruit is packed, acetic bacteria, oidium and mycoderm form.

The preliminarily dried fruit cannot be used in big pieces for manufacturing purposes in certain industries because the volume of these big pieces (half or divided fruit) increases in the course of time owing to the absorption of moisture from the air, and as they swell if enveloped with other substances, such as chocolate, and then are destroyed.

It is therefore advisable to coat with fruit acid or sugar preliminarily dried fruit, from which the largest portion of the juice or moisture has been removed already, not by atomizing them, but by mixing the fruit pieces, so that every fruit piece, even the smallest, is oversaturated with fruit acid and neutralized again by addition of sugar. The sugar possesses the property to absorb the moisture which, by the disintegration of the fruit, is driven to the surface, whereby, as mentioned above, a crystallization takes place, during which bound heat is liberated, so that a thorough evaporation of the moisture is obtained.

Besides obtaining a lasting preservation, the fruit is according to the invention, improved as regards taste, aroma and color, preserved absolutely unchanged as regards fruit acid and glucose and possesses its full vitamin content.

Novel foods can be produced from fruit pieces thus treated in a suitable form and mixture of different fruits.

These treated fruit pieces can be shaped by pressing, pouring or melting with suitable admixtures of fats, vegetable or other organic binding substances, sugar, sugar substitutes, chocolate, marchpane, flavoring substances and the like, to form briquettes, bars, cakes, pastilles, pills, tablets and the like.

If the fruit pieces thus preserved are placed, for example, in water or in some other liquid or in another suitable mass, the protecting covering dissolves and the fruit is absolutely undamaged and eatable. It can thus be served as stewed fruit, jam, fruit pudding or the like.

In practicing the present invention I may coat the fruit with sugar or fruit acid or a mixture of sugar and fruit acid in the dry state, to form the preserved fruit fragments mentioned ante.

I claim:

1. A method of preserving fruit which comprises disintegrating preliminarily dried fruit, from which the largest portion of the moisture has been removed, into fragments and then coating the fragments so obtained, with dry pulverulent sugar, the sugar absorbing the moisture which has been driven to the surface of said fragments by said disintegration and forming a dry, stable coating on said fragments.

2. The process of claim 1 wherein the dry, pulverulent sugar contains fruit acid admixed therewith, the final fruit fragments being oversaturated with fruit acid and neutralized with the sugar.

KARL HESSEL.